(12) United States Patent
Uchibori et al.

(10) Patent No.: US 9,739,312 B2
(45) Date of Patent: Aug. 22, 2017

(54) BEARING MECHANISM, SPINDLE MOTOR INCLUDING THE BEARING MECHANISM AND ELECTRONIC EQUIPMENT INCLUDING THE SPINDLE MOTOR

(71) Applicant: Nidec Corporation, Kyoto (JP)

(72) Inventors: Hirotoshi Uchibori, Kyoto (JP); Toshihiro Akiyama, Kyoto (JP); Atsushi Yawata, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 621 days.

(21) Appl. No.: 14/458,437

(22) Filed: Aug. 13, 2014

(65) Prior Publication Data

US 2015/0084463 A1 Mar. 26, 2015

Related U.S. Application Data

(60) Provisional application No. 61/881,588, filed on Sep. 24, 2013.

(51) Int. Cl.
*F16C 33/74* (2006.01)
*H02K 5/167* (2006.01)
*H02K 7/08* (2006.01)

(52) U.S. Cl.
CPC ......... *F16C 33/745* (2013.01); *H02K 5/1677* (2013.01); *F16C 2370/12* (2013.01); *H02K 7/08* (2013.01)

(58) Field of Classification Search
CPC . F16C 2370/12; F16C 33/745; H02K 5/1677; H02K 7/08
USPC ............................................. 310/90; 384/112
See application file for complete search history.

(56) References Cited

U.S. PATENT DOCUMENTS

| 8,587,895 | B1 | 11/2013 | Sumiji et al. |
| 8,599,513 | B1 | 12/2013 | Kimura et al. |
| 2004/0090702 | A1 | 5/2004 | Aiello et al. |
| 2008/0006332 | A1 | 1/2008 | Ishizawa et al. |
| 2009/0140587 | A1 | 6/2009 | Popov et al. |

(Continued)

FOREIGN PATENT DOCUMENTS

JP 2009-136143 A 6/2009

OTHER PUBLICATIONS

Yawata et al.; "Spindle Motor and Disk Drive Apparatus"; U.S. Appl. No. 14/458,426, filed Aug. 13, 2014.

(Continued)

*Primary Examiner* — Alex W Mok
(74) *Attorney, Agent, or Firm* — Keating & Bennett, LLP

(57) ABSTRACT

A bearing mechanism includes a stationary portion and a rotating portion. The stationary portion includes a shaft portion and a plate portion. The rotating portion includes a sleeve including an annular portion, a cylindrical portion, an annular bottom surface, and a first communication hole. The rotating portion includes a ring member arranged to cover at least a portion of an opening of the first communication hole, and faces the plate portion via a first gap. A pumping groove array is disposed in the plate portion or the ring member. A second communication hole is disposed between the ring member and the annular bottom surface, and connected to the first communication hole. At least a portion of the opening of the second communication hole is positioned on a farther radial direction inner side than the pumping groove array.

26 Claims, 10 Drawing Sheets

(56) References Cited

U.S. PATENT DOCUMENTS

| | | |
|---|---|---|
| 2010/0124387 A1 | 5/2010 | Fuss et al. |
| 2010/0195250 A1* | 8/2010 | Sekii ................... F16C 17/105 360/234.1 |
| 2010/0315742 A1 | 12/2010 | Kimura et al. |
| 2011/0235210 A1* | 9/2011 | Himeno ................ F16C 17/107 360/99.08 |
| 2012/0033329 A1 | 2/2012 | Mizukami et al. |
| 2012/0043842 A1* | 2/2012 | Choi ....................... F16C 17/12 310/90 |
| 2012/0092788 A1* | 4/2012 | Yawata ................ F16C 17/045 360/55 |
| 2012/0213459 A1* | 8/2012 | Yamada ............... F16C 17/026 384/112 |
| 2012/0326543 A1 | 12/2012 | Kimura et al. |
| 2013/0003223 A1 | 1/2013 | Kimura et al. |
| 2013/0077190 A1 | 3/2013 | Kimura et al. |
| 2013/0120868 A1 | 5/2013 | Mizukami et al. |
| 2013/0128379 A1 | 5/2013 | Mizukami et al. |
| 2013/0193792 A1* | 8/2013 | Kim ........................ H02K 5/15 310/90 |
| 2013/0321951 A1 | 12/2013 | Sumiji et al. |
| 2014/0010065 A1 | 1/2014 | Kimura et al. |

OTHER PUBLICATIONS

Yawata; "Spindle Motor and Disk Drive Apparatus"; U.S. Appl. No. 14/458,413, filed Aug. 13, 2014.

* cited by examiner

BEARING MECHANISM, SPINDLE MOTOR INCLUDING THE BEARING MECHANISM AND ELECTRONIC EQUIPMENT INCLUDING THE SPINDLE MOTOR

BACKGROUND OF THE INVENTION

1. Field of the Invention

The present invention relates to a bearing mechanism, a spindle motor including the bearing mechanism, and electronic equipment including the spindle motor.

2. Description of the Related Art

Spindle motors, which rotate disks, are mounted on hard disk devices and optical disk devices. The spindle motor includes a stationary portion that is fixed to a housing of the device, and a rotating portion that rotates while supporting the disk. The spindle motor generates torque by using magnetic flux that is generated between a stator and a magnet, and rotates the rotating portion with respect to the stationary portion.

The stationary portion and the rotating portion of the spindle motor are connected via a fluid dynamic pressure bearing. An example of a spindle motor of the related art that includes a fluid dynamic pressure bearing is disclosed in U.S. Pre-Grant Patent Application Publication No. 2010/0124387. In the spindle motor of U.S. Pre-Grant Patent Application Publication No. 2010/0124387, a pumping seal 36 is disposed in a seal gap 32 between an outer circumferential surface of a bearing sleeve 14 and a surface of a second bearing constituting member 18.

In recent years, it is required that this type of spindle motor suppress a current value in view of energy-saving and environmental performances.

SUMMARY OF THE INVENTION

An exemplary preferred embodiment of a bearing mechanism of the present invention includes a stationary portion and a rotating portion. The stationary portion includes a shaft portion that is arranged along a central axis which extends upward and downward, and a plate portion that extends to a radial direction outer side from the shaft portion and has an annular or substantially annular shape. The rotating portion includes a sleeve that is rotatable around the shaft portion.

The sleeve includes an annular portion that has an annular or substantially annular shape, a cylindrical portion, an annular bottom surface, and a first communication hole. The cylindrical portion extends from an outer edge of the annular portion toward an upper side. The annular bottom surface widens from an inner circumferential surface of the cylindrical portion to a radial direction inner side. The first communication hole has an opening that is open to the annular bottom surface, and penetrates the annular portion in an axial direction.

The rotating portion includes a ring member. The ring member is arranged to cover at least a portion of the opening of the first communication hole, and faces the plate portion via a first gap. An outer circumferential surface of the plate portion faces the inner circumferential surface of the cylindrical portion via an upper capillary seal portion whose gap in a radial direction is narrowed toward a lower side.

A lubricating oil is interposed in a space between the stationary portion and the rotating portion, which includes the upper capillary seal portion, the first gap, a second gap between an outer circumferential surface of the shaft and an inner circumferential surface of the sleeve, and the first communication hole.

A pumping groove array, which induces the lubricating oil to the radial direction inner side when the rotating portion rotates, is disposed in the plate portion or the ring member. A second communication hole is disposed between the ring member and the annular bottom surface. The second communication hole is a gap widening in the radial direction and connected to the first communication hole. At least a portion of an opening of the second communication hole is positioned on the farther radial direction inner side than the pumping groove array.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the following description, an upper side of a motor in a central axial direction is simply referred to as an "upper side," and a lower side of the motor in the central axial direction is simply referred to as a "lower side." Upper and lower directions do not illustrate positional relationships and directions at a time of incorporation into actual equipment. In addition, a direction that is parallel with a central axis J1 or a direction that is substantially parallel with the central axis J1 is referred to as an "axial direction," a radial direction about the central axis J1 is simply referred to as a "radial direction," and a circumferential direction about the central axis is simply referred to as a "circumferential direction."

In addition, the term "parallel direction" in the following description includes both a parallel and a substantially parallel direction. In addition, the term "orthogonal direction" in the following description includes both an orthogonal and a substantially orthogonal direction.

Figure 1:
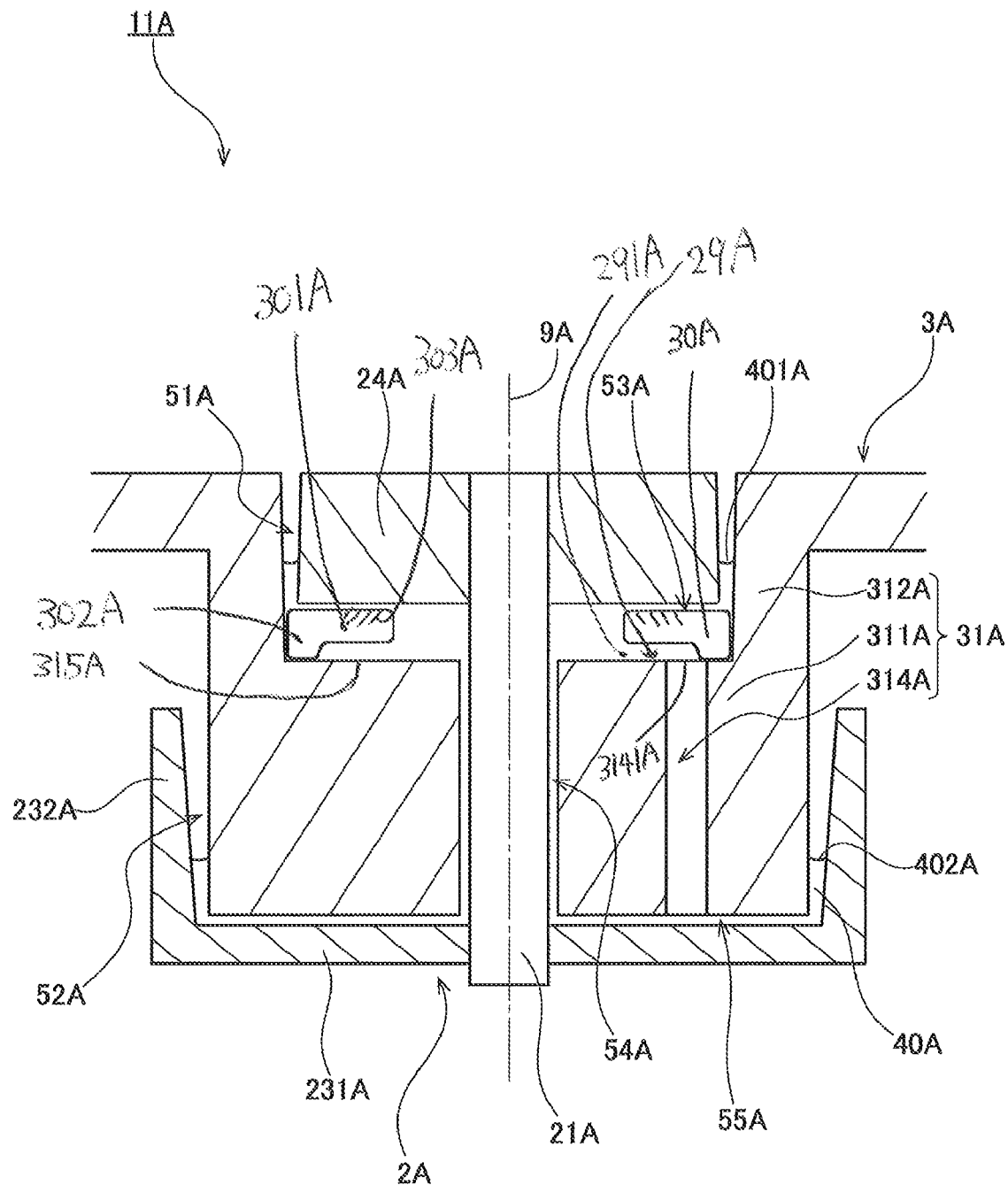
FIG. 1 is a partial schematic cross-sectional view of a spindle motor according to a first preferred embodiment of the present invention.

FIG. 1 is a partial schematic cross-sectional view of a spindle motor 11A according to a first preferred embodiment of the present invention.

As illustrated in FIG. 1, the spindle motor 11A includes a stationary portion 2A and a rotating portion 3A.

The stationary portion 2A preferably includes a shaft 21A, a circular plate portion 231A, a wall portion 232A, and a plate portion 24A. The shaft 21A is arranged along a central axis 9A that extends upward and downward. The circular plate portion 231A extends to a radial direction outer side from the shaft 21A. The wall portion 232A extends in a cylindrical or substantially cylindrical shape from an outer edge of the circular plate portion 231A toward the upper side. The plate portion 24A surrounds the shaft 21A on the upper side of the circular plate portion 231A. In addition, the plate portion 24A has an annular or substantially annular shape.

The rotating portion 3A is supported to be rotatable about the central axis 9A around the shaft 21A. The rotating portion 3A preferably includes a sleeve 31A and a ring member 30A. The sleeve 31A includes an annular portion 311A, a cylindrical portion 312A, a first communication hole 314A, and an annular bottom surface 315A. The annular portion 311A has an annular or substantially annular shape. The cylindrical portion 312A extends from an outer edge of the annular portion 311A toward the upper side. The first communication hole 314A penetrates the annular portion 311A in the axial direction. The annular bottom surface 315A widens to a radial direction inner side from an inner circumferential surface of the cylindrical portion 312A. The plate portion 24A is preferably accommodated in an annular concave portion that is defined by the cylindrical portion 312A and the annular bottom surface 315A. The first communication hole 314A may extend in a direction that is parallel with the central axis 9A, or may extend in a direction that is inclined with respect to the central axis 9A. In addition, the first communication hole 314A may extend discontinuously in the axial direction.

An outer circumferential surface of the plate portion 24A preferably faces the inner circumferential surface of the cylindrical portion 312A via an upper capillary seal portion 51A. In other words, the outer circumferential surface of the plate portion 24A and the inner circumferential surface of the cylindrical portion 312A of the sleeve 31A define the upper capillary seal portion 51A. A gap of the upper capillary seal portion 51A in the radial direction is narrowed toward the lower side.

An outer circumferential surface of the sleeve 31A preferably faces an inner circumferential surface of the wall portion 232A via a lower capillary seal portion 52A. In other words, the outer circumferential surface of the sleeve 31A and the inner circumferential surface of the wall portion 232A define the lower capillary seal portion 52A. A gap of the lower capillary seal portion 52A in the radial direction is narrowed toward the lower side.

As illustrated in FIG. 1, a lower surface of the plate portion 24A and an upper surface of the ring member 30A (described later) define a first gap 53A. An outer circumferential surface of the shaft 21A and an inner circumferential surface of the sleeve 31A constitute a second gap 54A. A lower surface of the sleeve 31A and an upper surface of the circular plate portion 231A define a third gap 55A. The first gap 53A and the third gap 55A are allowed to communicate with each other in the axial direction by the first communication hole 314A and a second communication hole 29A.

Small gaps between the shaft 21A, the circular plate portion 231A, the wall portion 232A, the plate portion 24A, the ring member 30A, and the sleeve 31A are preferably filled with a lubricating oil 40A. In other words, the lubricating oil 40A is interposed in a space between the stationary portion 2A and the rotating portion 3A, which includes the upper capillary seal portion 51A, the first gap 53A, the second gap 54A, the third gap 55A, the first communication hole 314A, the second communication hole 29A, and the lower capillary seal portion 52A. In a stationary state, an upper liquid surface 401A of the lubricating oil 40A is positioned in the upper capillary seal portion 51A. In addition, in the stationary state, a lower liquid surface 402A of the lubricating oil 40A is positioned in the lower capillary seal portion 52A.

It is preferable that the ring member 30A have an annular shape in the circumferential direction. The ring member 30A is arranged to cover at least a portion of an opening 3141A of the first communication hole 314A. The ring member 30A preferably includes a ring member flat plate portion 301A that widens in the radial direction, an annular lower convex portion 302A, and a pumping groove array 303A. The ring member flat plate portion 301A widens in the radial direction. It is preferable that the ring member flat plate portion 301A widen in an annular shape in the circumferential direction. The annular lower convex portion 302A extends from the ring member flat plate portion 301A toward the lower side. It is preferable that the annular lower convex portion 302A widen in an annular shape in the circumferential direction. The pumping groove array 303A is preferably arranged on an upper surface of the ring member flat plate portion 301A. When the rotating portion 3A rotates, the lubricating oil 40A is made to move to the radial direction inner side. The ring member flat plate portion 301A, the plate portion 24A, the lubricating oil 40A, and the pumping groove array 303A may define a thrust dynamic pressure bearing portion or may define a pumping seal portion when the rotating portion 3A rotates. The pumping groove array may be disposed in the plate portion 24A or the ring member 30A, and the pumping groove array 303A may be disposed on the lower surface of the plate portion 24A.

It is preferable that the ring member 30A be in contact with the annular bottom surface 315A. The ring member 30A is fixed to the sleeve 31A. A gap is disposed between an outer circumferential surface of the ring member 30A and the cylindrical portion 312A, and an adhesive is interposed in the gap. The ring member 30A may be press-fitted into the cylindrical portion 312A. Since the ring member 30A is fixed to the sleeve 31A, the flatness of the ring member flat plate portion 301A with respect to the central axis is significantly improved. In addition, the first gap 53A is configured with high accuracy.

The second communication hole 29A is preferably disposed between the ring member 30A and the annular bottom surface 315A. The second communication hole 29A widens in the radial direction and is connected to the first communication hole 314A. Specifically, the second communication hole 29A is connected to the opening 3141A of the first communication hole 314A. The second communication hole 29A extends to the radial direction inner side from an opening of the opening 3141A of the first communication hole 314A and is open to an inner side of the pumping groove array 303A. In other words, at least a portion of an opening 291A of the second communication hole 29A is positioned on a farther inner side than the pumping groove array 303A. It is preferable that the pumping groove array 303A be superimposed in the axial direction on the first communication hole 314A and the second communication hole 29A. The entire opening 291A of the second communication hole 29A may be positioned on the farther inner side than the pumping groove array 303A. In addition, a portion of the opening 291A of the second communication hole 29A may be superimposed on an area of the pumping groove array 303A. A portion of the opening 291A of the second communication hole 29A and the pumping groove array 303A may be directly superimposed.

Since at least a portion of the opening 291A of the second communication hole 29A is preferably positioned on a farther radial direction inner side than the pumping groove array 303A, the pumping groove array 303A is arranged on the radial direction inner side. Accordingly, loss that is caused when the pumping groove array 303A is disposed is significantly reduced.

Figure 2:
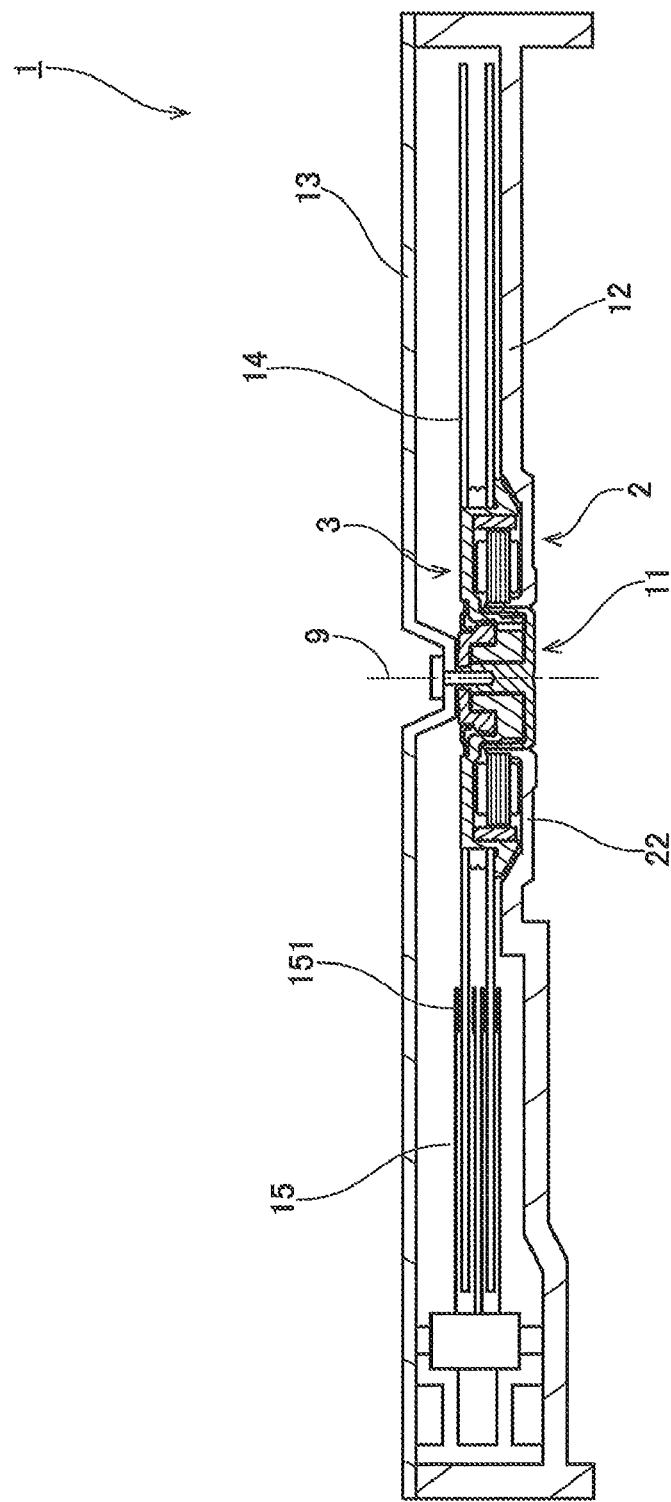
FIG. 2 is a schematic cross-sectional view of a disk drive device according to a second preferred embodiment of the present invention.

FIG. 2 is a schematic cross-sectional view of a disk drive device 1 according to a second preferred embodiment. The disk drive device 1 is a device that rotates a magnetic disk 14 (hereinafter, simply referred to as a "disk 14") to perform reading and writing of information on the disk 14. As illustrated in FIG. 2, the disk drive device 1 preferably includes a spindle motor 11, a device housing 12, a cover 13, the two disks 14, and an access unit 15.

The spindle motor 11 rotates the disks 14 about a central axis 9 while supporting the disks 14. The spindle motor 11 includes a stationary portion 2 with a base portion 22, and a rotating portion 3. The base portion 22 is preferably a portion of the device housing 12, and is defined by a member that is connected to another site of the device housing 12.

The cover 13 covers an opening in an upper portion of the device housing 12.

The rotating portion 3 of the spindle motor 11, the two disks 14, and the access unit 15 are accommodated in a casing that is provided by the device housing 12 including the base portion 22, and the cover 13.

The disks 14 are supported in the rotating portion 3 of the spindle motor 11. The disks 14 rotate with the rotating portion 3 when the spindle motor 11 is driven.

The access unit 15 moves a head 151 along recording surfaces of the disks 14 to preferably perform the reading and the writing of the information on the disks 14. Alternatively, the access unit 15 may perform only one of the reading and the writing of the information on the disks 14.

The number of the disks 14 mounted on the disk drive device 1 may be one or three or more.

Figure 3:
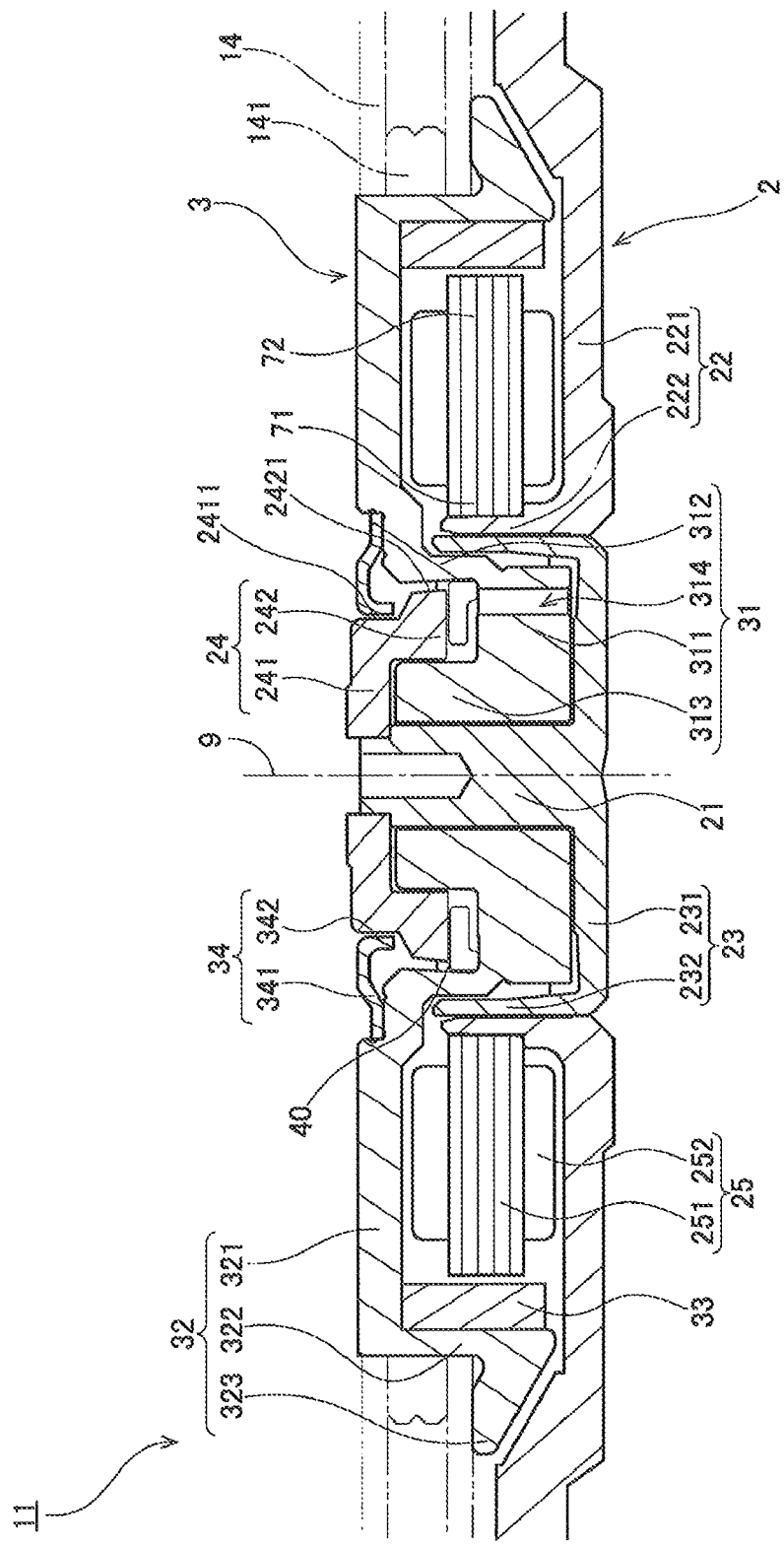
FIG. 3 is a schematic cross-sectional view of a spindle motor according to the second preferred embodiment of the present invention.
Figure 4:
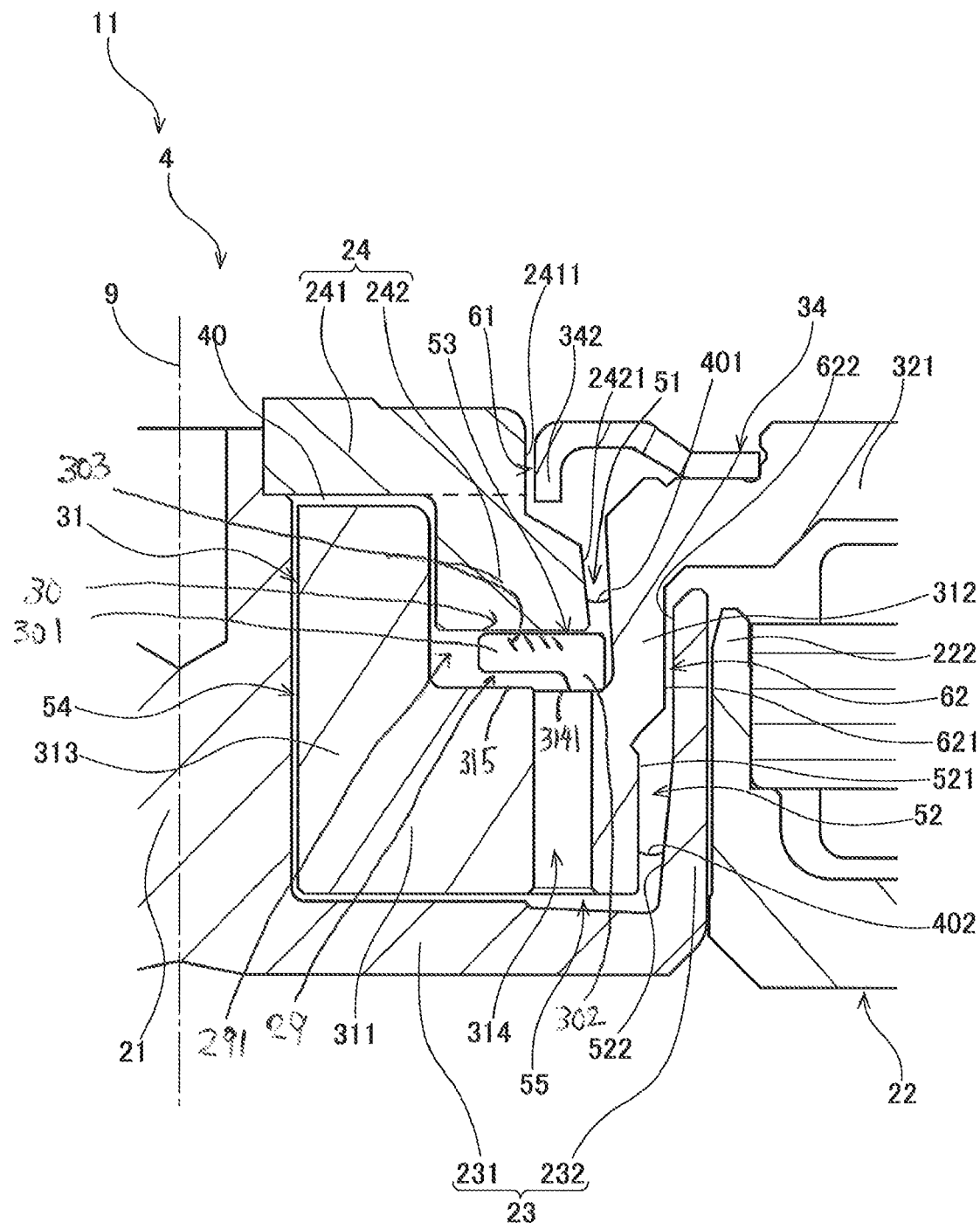
FIG. 4 is a partial schematic cross-sectional view of the spindle motor according to the second preferred embodiment of the present invention.

A configuration of the spindle motor 11 will be described. FIG. 3 is a schematic cross-sectional view of the spindle motor 11. FIG. 4 is a partial schematic cross-sectional view of the spindle motor 11. As illustrated in FIG. 3, the spindle motor 11 preferably includes the stationary portion 2 that is relatively stationary with respect to the device housing 12 of the disk drive device 1, and the rotating portion 3 that rotates about the central axis 9 while supporting the disks 14.

The stationary portion 2 preferably includes a shaft 21, the base portion 22, a cup portion 23, a plate portion 24, and a stator unit 25.

The shaft 21 is arranged along the central axis 9 that extends upward and downward, and has a columnar or substantially columnar shape. The plate portion 24 is fixed to the vicinity of an upper end portion of the shaft 21. In addition, the cup portion 23 is preferably arranged in the vicinity of a lower end portion of the shaft 21. The shaft 21 is preferably made of a metal such as stainless steel.

In addition, the upper end portion of the shaft 21 is fixed to the cover 13 of the disk drive device 1 (refer to FIG. 2). The lower end portion of the shaft 21 is fixed to the base portion 22 via the cup portion 23.

As described above, the base portion 22 is preferably a portion of the device housing 12 (refer to FIG. 2) of the disk drive device 1, and includes the member that is connected to the other site of the device housing 12. However, the base portion 22 and the device housing 12 may also be provided as separate members, if so desired. The base portion 22 includes a bottom plate portion 221 that widens in the radial direction, and a holder portion 222 that protrudes from an inner edge of the bottom plate portion 221 toward the upper side and has a cylindrical or substantially cylindrical shape. The base portion 22 is preferably made of a metal such as, for example, an aluminum alloy.

The cup portion 23 is a site that is arranged in the vicinity of the lower end portion of the shaft 21 and has an annular shape. In this preferred embodiment, the shaft 21 and the cup portion 23 are preferably provided as connected portions of the single monolithic member. However, the shaft 21 and the cup portion 23 may also be provided as separate members, if so desired.

The cup portion 23 preferably includes a circular plate portion 231 that extends to the radial direction outer side from the shaft, and a wall portion 232 that extends toward the upper side from an outer edge of the circular plate portion 231 and has a cylindrical or substantially cylindrical shape. The wall portion 232 is fixed to an inner circumferential surface of the holder portion 222 of the base portion 22. The cup portion 23 has an L-shaped or substantially L-shaped longitudinal sectional shape due to the circular plate portion 231 and the wall portion 232.

The plate portion 24 is preferably a member that is fixed to an outer circumferential surface of the shaft 21 and has a substantially annular shape. The plate portion 24 surrounds the shaft 21 on the upper side of the circular plate portion 231 of the cup portion 23. The plate portion 24 is preferably, for example, press-fitted into the vicinity of the upper end portion of the shaft 21 and is fixed to the shaft 21 by an adhesive. However, the shaft 21 and the plate portion 24 may alternatively be configured as connected portions of a single monolithic member.

The plate portion 24 according to this preferred embodiment preferably includes a plate portion flat plate portion 241 and a plate portion annular convex portion 242. The plate portion flat plate portion 241 is fixed to the outer circumferential surface of the shaft 21 and widens to the radial direction outer side from the shaft 21. The plate portion annular convex portion 242 extends in a cylindrical or substantially cylindrical shape from an outer edge of the plate portion flat plate portion 241 toward the lower side. More specifically, the plate portion annular convex portion 242 extends from a lower surface of the outer edge of the plate portion flat plate portion 241 toward the lower side.

In this preferred embodiment, the plate portion annular convex portion 242 corresponds to a portion on the lower side from a virtual plane obtained by extending the lower surface of the plate portion flat plate portion 241 to the radial direction outer side. Accordingly, the plate portion flat plate portion 241 includes a flat plate portion outer circumferential surface 2411 that defines a portion of an upper labyrinth seal portion 61 (described later). In addition, the plate portion annular convex portion 242 preferably includes an annular convex portion outer circumferential surface 2421 that defines a portion of an upper capillary seal portion 51 (described later).

The annular convex portion illustrates a site on the radial direction outer side from a virtual plane obtained by extending an inner circumferential surface of the plate portion annular convex portion 242 according to this preferred embodiment to the axial direction upper side. In this configuration, the annular convex portion includes an outer circumferential surface that defines a portion of the upper labyrinth seal portion 61 and an outer circumferential surface that constitutes a part of the upper capillary seal portion 51.

The stator unit 25 includes a stator core 251 and a plurality of coils 252. The stator core 251 preferably includes a core back 71 that has an annular shape, and a plurality of teeth 72. The core back 71 is fixed to an outer circumferential surface of the holder portion 222 of the base portion 22. Each of the teeth 72 protrudes from the core back 71 toward the radial direction outer side. The stator core 251 is preferably, for example, a laminated steel plate in which magnetic steel sheets are laminated in the axial direction. Conductive wires that are wound around the respective teeth 72 constitute the coils 252.

The rotating portion 3 preferably includes a sleeve 31, a hub 32, a rotor magnet 33, a cap 34, and a ring member 30.

The sleeve 31 rotates about the central axis 9 around the shaft 21. The sleeve 31 preferably includes an annular portion 311, an outer side cylindrical portion 312 that corresponds to the cylindrical portion 312A in FIG. 1, an inner side cylindrical portion 313, a first communication hole 314, and an annular bottom surface 315. The annular portion 311 has an annular or substantially annular shape. The first communication hole 314 that extends in the axial direction from the annular bottom surface 315 to a lower surface is preferably provided in the annular portion 311. The annular bottom surface 315 widens to the radial direction inner side from an inner circumferential surface of the outer side cylindrical portion 312. The outer side cylindrical portion 312 is a portion that extends from an outer edge of the annular portion 311 toward the upper side and has a cylindrical or substantially cylindrical shape. In addition, the inner side cylindrical portion 313 is a portion that extends from an inner edge of the annular portion 311 toward the upper side and has a cylindrical or substantially cylindrical shape. On an inner circumferential surface of the sleeve 31, an inner circumferential surface of the annular portion 311 and an inner circumferential surface of the inner side cylindrical portion 313 are successive and connected surfaces. The inner circumferential surface of the sleeve 31 and the outer circumferential surface of the shaft 21 face each other in the radial direction via a slight gap. The first communication hole 314 may extend in a direction that is parallel with the central axis 9, or may extend in a direction that is inclined with respect to the central axis 9. In addition, the first communication hole 314 may extend discontinuously in the axial direction.

The annular portion 311 and the inner side cylindrical portion 313 of the sleeve 31 are arranged between the plate portion flat plate portion 241 of the plate portion 24 and the circular plate portion 231 of the cup portion 23 in relation to the axial direction. The plate portion 24 is accommodated in an annular concave portion that is defined by the inner side cylindrical portion 313, the annular bottom surface 315, and the outer side cylindrical portion 312.

The hub 32 preferably includes a top plate portion 321, a cylindrical portion 322, and a flange portion 323. The top plate portion 321 is a portion that widens toward the radial direction outer side from an upper end of the outer side cylindrical portion 312 of the sleeve 31 and has a cylindrical or substantially circular plate shape. The cylindrical portion 322 is preferably a portion that extends toward the lower side from an outer edge of the top plate portion 321 and has a cylindrical or substantially cylindrical shape. In addition, the flange portion 323 is preferably a portion that protrudes toward the radial direction outer side from a lower end of the cylindrical portion 322.

At least a portion of an outer circumferential surface of the cylindrical portion 322 is a contact surface that is in contact with inner circumferential portions of the two disks 14. In addition, an upper surface of the flange portion 323 is a mounting surface on which the lower disk 14 is mounted. The lower disk 14 is mounted on the upper surface of the flange portion 323, and the upper disk 14 is mounted thereon via a spacer 141. The inner circumferential portion of each of the disks 14 is in contact with the outer circumferential surface of the cylindrical portion 322 such that a position of each of the disks 14 in the radial direction is determined. In this manner, the cylindrical portion 322 and the flange portion 323 are supporting portions that support the two disks 14.

In this preferred embodiment, the sleeve 31 and the hub 32 are preferably defined by connected portions of a monolithic member. Examples of the materials of the sleeve 31 and the hub 32 include a metal such as, for example, ferromagnetic stainless steel. However, the sleeve 31 and the hub 32 may also be separately provided members.

The rotor magnet 33 is fixed to an inner circumferential surface of the cylindrical portion 322 of the hub 32. The rotor magnet 33 has an annular shape about the central axis 9. An inner circumferential surface of the rotor magnet 33 faces outer circumferential surfaces of the plurality of teeth 72 of the stator core 251 in the radial direction. In addition, the inner circumferential surface of the rotor magnet 33 is a magnetic pole surface where N poles and S poles are alternately arranged.

The cap 34 is preferably a member that is fixed to an upper surface of the top plate portion 321 of the hub 32 and has an annular shape. The cap 34 is positioned on the upper side of the upper capillary seal portion 51 (described later). The cap 34 is preferably obtained through, for example, press working of a metal. However, the cap 34 may be obtained by any other desirable method or may also be a resin molded article. The cap 34 in this preferred embodiment preferably includes a plate-shaped portion 341 and a protruding portion 342. The plate-shaped portion 341 preferably has a disk shape or a substantially disk shape widening in the radial direction, and an outer end portion of the plate-shaped portion 341 is fixed to the top plate portion 321 of the hub 32. The protruding portion 342 protrudes toward the lower side from an inner edge of the plate-shaped portion 341. An inner circumferential surface of the protruding portion 342 faces an outer circumferential surface of the plate portion 24 in the radial direction via a slight gap.

As illustrated in FIG. 4, a lubricating oil 40 is preferably interposed in small gaps between the shaft 21, the cup portion 23, the plate portion 24, the sleeve 31, and the ring member 30. Examples of the lubricating oil 40 preferably include, for example, an oil whose main component is ester such as polyol ester-based oil and diester-based oil.

As illustrated in FIG. 3, the rotating portion 3 is supported to be rotatable via the lubricating oil 40 with respect to the stationary portion 2. In other words, in this preferred embodiment, the shaft 21, the cup portion 23, the plate portion 24, the sleeve 31, the ring member 30, and the lubricating oil 40 constitute a fluid bearing portion 4 that connects the stationary portion 2 with the rotating portion 3 in a relatively rotatable state.

In the spindle motor 11 described above, magnetic flux in the radial direction is generated in the plurality of teeth 72 of the stator core 251 when a drive current is applied to the coils 252 of the stationary portion 2. Then, torque in a circumferential direction is generated due to the effect of the magnetic flux between the teeth 72 and the rotor magnet 33. This causes the rotating portion 3 to rotate about the central axis 9 with respect to the stationary portion 2. The disks 14 that are supported by the hub 32 rotate about the central axis 9 with the rotating portion 3.

Next, a structure of the fluid bearing portion 4 will be described with reference to FIGS. 3 and 4.

As illustrated in FIG. 4, the fluid bearing portion 4 preferably includes the upper capillary seal portion 51, a lower capillary seal portion 52, a first gap 53, a second gap 54, a third gap 55, the upper labyrinth seal portion 61, and a lower labyrinth seal portion 62.

The annular convex portion outer circumferential surface 2421 that is an outer circumferential surface of the plate portion annular convex portion 242 and the inner circumferential surface of the outer side cylindrical portion 312 of the sleeve 31 define the upper capillary seal portion 51. In other words, the annular convex portion outer circumferential surface 2421 faces the inner circumferential surface of the outer side cylindrical portion 312 in the radial direction via the upper capillary seal portion 51. In addition, a gap of the upper capillary seal portion 51 in the radial direction is narrowed toward the lower side.

In this preferred embodiment, the plate portion 24 preferably includes the plate portion flat plate portion 241 and the plate portion annular convex portion 242 that extends toward the lower side. The sleeve 31 preferably includes the annular portion 311, the outer side cylindrical portion 312, the inner side cylindrical portion 313, and the first communication hole 314. In addition, the cup portion 23 preferably includes the circular plate portion 231 and the wall portion 232. In this case, the upper capillary seal portion 51 preferably is longer in the axial direction than in a case where the plate portion 24 only includes the plate portion flat plate portion 241. Accordingly, the spindle motor 11 is very thin in the axial direction.

As illustrated in FIG. 4, the sleeve 31 preferably includes a first outer circumferential surface 521 and a second outer circumferential surface 621. More specifically, the annular portion 311 of the sleeve 31 includes the first outer circumferential surface 521. In addition, the outer side cylindrical portion 312 of the sleeve 31 has the second outer circumferential surface 621. The second outer circumferential surface 621 is positioned on the axial direction upper side of the first outer circumferential surface 521. In addition, the wall portion 232 preferably includes a first inner circumferential surface 522 and a second inner circumferential surface 622. The first inner circumferential surface 522 is positioned in a lower portion of an inner circumferential surface of the wall portion 232. The second inner circumferential surface 622 is positioned on the axial direction upper side of the first inner circumferential surface 522.

The outer side cylindrical 312 portion preferably includes the first outer circumferential surface 521 that defines a portion of the lower capillary seal portion 52 and the second outer circumferential surface 621 that defines a portion of the lower labyrinth seal portion 62.

The first outer circumferential surface 521 and the first inner circumferential surface 522 define the lower capillary seal portion 52. In other words, the first outer circumferential surface 521 faces the first inner circumferential surface 522 in the radial direction via the lower capillary seal portion 52. In addition, a gap of the lower capillary seal portion 52 in the radial direction is narrowed toward the lower side.

A lower surface of the plate portion annular convex portion 242 and the annular bottom surface 315 preferably define the first gap 53. The outer circumferential surface of the shaft 21 and the inner circumferential surface of the inner side cylindrical portion 313 preferably define the second gap 54. A lower surface of the annular portion 311 and an upper surface of the circular plate portion 231 preferably define the third gap 55. In addition, the first gap 53 and the third gap 55 are allowed to communicate with each other in the axial direction by the first communication hole 314 and a second communication hole 29.

It is preferable that the ring member 30 has an annular shape in the circumferential direction. The ring member 30 is arranged to cover at least a portion of an opening 3141 of the first communication hole 314. The ring member 30 preferably includes a ring member flat plate portion 301 that widens in the radial direction, an annular lower convex portion 302, and a pumping groove array 303. The ring member flat plate portion 301 widens in the radial direction. It is preferable that the ring member flat plate portion 301 widen in an annular shape in the circumferential direction. The annular lower convex portion 302 extends from the ring member flat plate portion 301 toward the lower side. It is preferable that the annular lower convex portion 302 widen in an annular shape in the circumferential direction.

The pumping groove array 303 is preferably provided on an upper surface of the ring member flat plate portion 301. The pumping groove array 303 is, for example, a groove array that has a spiral shape or a groove array that has a herringbone shape. When the rotating portion 3 rotates, the lubricating oil 40 is induced to the radial direction inner side. The ring member flat plate portion 301, the plate portion 24, the lubricating oil 40, and the pumping groove array 303 may define a thrust dynamic pressure bearing portion or may define a pumping seal portion when the rotating portion 3 rotates. The pumping groove array 303 may be disposed on a lower surface of the plate portion 24.

In addition, a lower thrust dynamic pressure groove array (not illustrated) is disposed on the upper surface of the circular plate portion 231 or the lower surface of the annular portion 311 positioned within the third gap 55. The lower thrust dynamic pressure groove array is, for example, a groove array that has a spiral shape or a groove array that has a herringbone shape. When the spindle motor 11 is driven, the dynamic pressure is induced to the lubricating oil 40 by the lower thrust dynamic pressure groove array to define a lower thrust dynamic pressure bearing in the third gap 55. An upper thrust dynamic pressure bearing and the lower thrust dynamic pressure bearing cause the rotating portion 3 to rotate while being supported in the axial direction.

In addition, a radial dynamic pressure groove array (not illustrated) is preferably disposed on the inner circumferential surface of the inner side cylindrical portion 313 or the outer circumferential surface of the shaft 21 positioned in the second gap 54. The radial dynamic pressure groove array is, for example, a groove array that has a herringbone shape. When the spindle motor 11 is driven, the dynamic pressure is induced to the lubricating oil 40 by the radial dynamic pressure groove array to constitute a radial dynamic pressure bearing in the second gap 54. The radial dynamic pressure bearing causes the rotating portion 3 to rotate while being supported in the radial direction. The number of the radial dynamic pressure bearing disposed in the second gap 54 may be one or two or any other desirable number.

As described above, the small gaps between the shaft 21, the cup portion 23, the plate portion 24, the sleeve 31, and the ring member 30 is filled with the lubricating oil 40. In other words, the lubricating oil 40 is interposed in a space between the stationary portion 2 and the rotating portion 3, which includes the upper capillary seal portion 51, the first gap 53, the second gap 54, the third gap 55, the first communication hole 314, and the second communication hole 29, and the lower capillary seal portion 52.

In the stationary state of the spindle motor 11, an upper liquid surface 401 of the lubricating oil 40 is preferably positioned in the upper capillary seal portion 51. In addition, in the stationary state, a lower liquid surface 402 of the lubricating oil 40 is preferably positioned in the lower capillary seal portion 52. This causes the upper liquid surface 401 and the lower liquid surface 402 of the lubricating oil 40 to have a meniscus liquid surface shape due to surface tension. As a result, leaking from the upper liquid surface 401 and the lower liquid surface 402 of the lubricating oil 40 is significantly reduced or prevented.

As illustrated in FIG. 4, in this preferred embodiment, the inner circumferential surface of the outer side cylindrical portion 312 that defines the upper capillary seal portion 51 is preferably inclined to the axial direction upper side and the radial direction inner side. In addition, the annular convex portion outer circumferential surface 2421 is preferably inclined to the axial direction upper side and the radial direction inner side. In other words, the upper capillary seal portion 51 is inclined to the radial direction inner side toward the upper side. Accordingly, a centrifugal force toward a lower end portion side of the upper capillary seal portion 51 is applied to the lubricating oil 40 in the upper capillary seal portion 51 when the spindle motor 11 is driven. Accordingly, leaking of the lubricating oil 40 out of the spindle motor 11 from the upper capillary seal portion 51 is significantly reduced or prevented. In addition, the shape ensures the thickness of an upper portion of the outer side cylindrical portion 312 in the radial direction. In this manner, the thickness in the radial direction and the strength near a boundary between the outer side cylindrical portion 312 and the top plate portion 321 of the hub 32 are ensured.

In addition, in this preferred embodiment, the lower capillary seal portion 52 is preferably positioned farther in the radial direction outer side than the upper capillary seal portion 51. The first outer circumferential surface 521 that defines the lower capillary seal portion 52 is preferably parallel with the central axis 9. In addition, the first inner circumferential surface 522 that defines the lower capillary seal portion 52 is preferably inclined to the axial direction upper side and the radial direction outer side. In this manner, the thickness in the radial direction and the strength near a boundary between the annular portion 311 of the sleeve 31 and outer side cylindrical portion 312 are ensured.

The flat plate portion outer circumferential surface 2411 and the inner circumferential surface of the protruding portion 342 define the upper labyrinth seal portion 61. As described above, the flat plate portion outer circumferential surface 2411 and the inner circumferential surface of the protruding portion 342 face each other via the slight gap in the radial direction. In this manner, gas inflow and outflow are significantly reduced or prevented in the gap. As a result, evaporation of the lubricating oil 40 from the upper liquid surface 401 is significantly reduced or prevented.

In this preferred embodiment, the upper labyrinth seal portion 61 is preferably positioned farther in the radial direction inner side than the upper capillary seal portion 51. In this case, the distance from the central axis 9 to the upper labyrinth seal portion 61 decreases, and the opening area of the gap in the upper labyrinth seal portion 61 decreases. Then, the gas inflow and outflow in the upper labyrinth seal portion 61 is further significantly reduced or prevented. As a result, the evaporation of the lubricating oil 40 from the upper liquid surface 401 is further significantly reduced or prevented.

In this case, an inner circumferential surface of the cap 34 is longer in the axial direction than in a case where the protruding portion 342 is absent. In this manner, the upper labyrinth seal portion 61 is long in the axial direction. Accordingly, the gas inflow and outflow in the upper labyrinth seal portion 61 is further significantly reduced or prevented. As a result, the evaporation of the lubricating oil 40 from the upper liquid surface 401 is further significantly reduced or prevented.

The second outer circumferential surface 621 and the second inner circumferential surface 622 define the lower labyrinth seal portion 62. The second outer circumferential surface 621 and the second inner circumferential surface 622 face each other via the slight gap in the radial direction. In this manner, the gas inflow and outflow is significantly reduced or prevented in the gap. As a result, evaporation of the lubricating oil 40 from the lower liquid surface 402 is significantly reduced or prevented.

In this preferred embodiment, the sleeve 31 preferably includes the second outer circumferential surface 621 that defines the lower labyrinth seal portion 62 on the upper side of the first outer circumferential surface 521 that defines the lower capillary seal portion 52 as described above. In other words, the sleeve 31 according to this preferred embodiment is preferably a connected member that includes the first outer circumferential surface 521 and the second outer circumferential surface 621. In this case, a shift in relative positions of the first outer circumferential surface 521 and the second outer circumferential surface 621 is prevented unlike in a case where the member including the first outer circumferential surface 521 and the member including the second outer circumferential surface 621 are configured as separate members. Accordingly, the lower capillary seal portion 52 and the lower labyrinth seal portion 62 are configured with high accuracy.

In addition, in this preferred embodiment, the wall portion 232 includes the second inner circumferential surface 622 that defines the lower labyrinth seal portion 62 on the upper side of the first inner circumferential surface 522 that defines the lower capillary seal portion 52 as described above. In other words, the wall portion 232 according to this preferred embodiment is preferably a single monolithic member that includes the first inner circumferential surface 522 and the second inner circumferential surface 622. In this case, a shift in relative positions of the first inner circumferential surface 522 and the second inner circumferential surface 622 is prevented unlike in a case where the member including the first inner circumferential surface 522 and the member including the second inner circumferential surface 622 are configured as separate members.

Accordingly, the lower capillary seal portion 52 and the lower labyrinth seal portion 62 are configured with even high accuracy.

In this preferred embodiment, an outer circumferential surface of the sleeve 31 and the inner circumferential surface of the wall portion 232 define the lower labyrinth seal portion 62. However, the present invention is not limited thereto. For example, the outer circumferential surface of the sleeve 31 and the inner circumferential surface of the holder portion 222 of the base portion 22 may define the lower labyrinth seal portion 62.

It is preferable that the ring member 30 be in contact with the annular bottom surface 315. The ring member 30 is fixed to the sleeve 31. A gap is disposed between an outer circumferential surface of the ring member 30 and the outer side cylindrical portion 312, and the adhesive is interposed in the gap. The ring member 30 may be press-fitted into the outer side cylindrical portion 312. When the ring member 30 is fixed to the sleeve 31, the flatness of the ring member flat plate portion 301 with respect to the central axis is significantly improved. In addition, the first gap 53 is configured with high accuracy.

The second communication hole 29 is preferably disposed between the ring member 30 and the annular bottom surface 315. The second communication hole 29 widens in the radial direction and is connected to the first communication hole 314. Specifically, the second communication hole 29 is connected to the opening 3141 of the first communication hole 314. The second communication hole 29 extends to the radial direction inner side from an opening of the opening 3141 of the first communication hole 314 and is open to an inner side of the pumping groove array 303.

In this preferred embodiment, an opening 291 of the second communication hole 29 is preferably positioned between an inner edge of the ring member flat plate portion 301 and the inner side cylindrical portion 313. At least a portion of the opening 291 of the second communication hole 29 is positioned on a farther inner side than the pumping groove array 303. It is preferable that the pumping groove array 303 be superimposed in the axial direction on the first communication hole 314 and the second communication hole 29. The entire opening 291 of the second communication hole 29 may be positioned on the farther inner side than the pumping groove array 303. In addition, a portion of the opening 291 of the second communication hole 29 may be superimposed on an area of the pumping groove array 303. A portion of the opening 291 of the second communication hole 29 and the pumping groove array 303 may be directly superimposed.

Since at least a portion of the opening 291 of the second communication hole 29 is positioned farther in the radial direction inner side than the pumping groove array 303, the pumping groove array 303 is arranged on the radial direction inner side. Accordingly, loss that is caused when the pumping groove array 303 is disposed is significantly reduced or prevented.

Exemplary preferred embodiments of the present invention has been described above. However, the present invention is not limited to the preferred embodiments described above.

Figure 5:
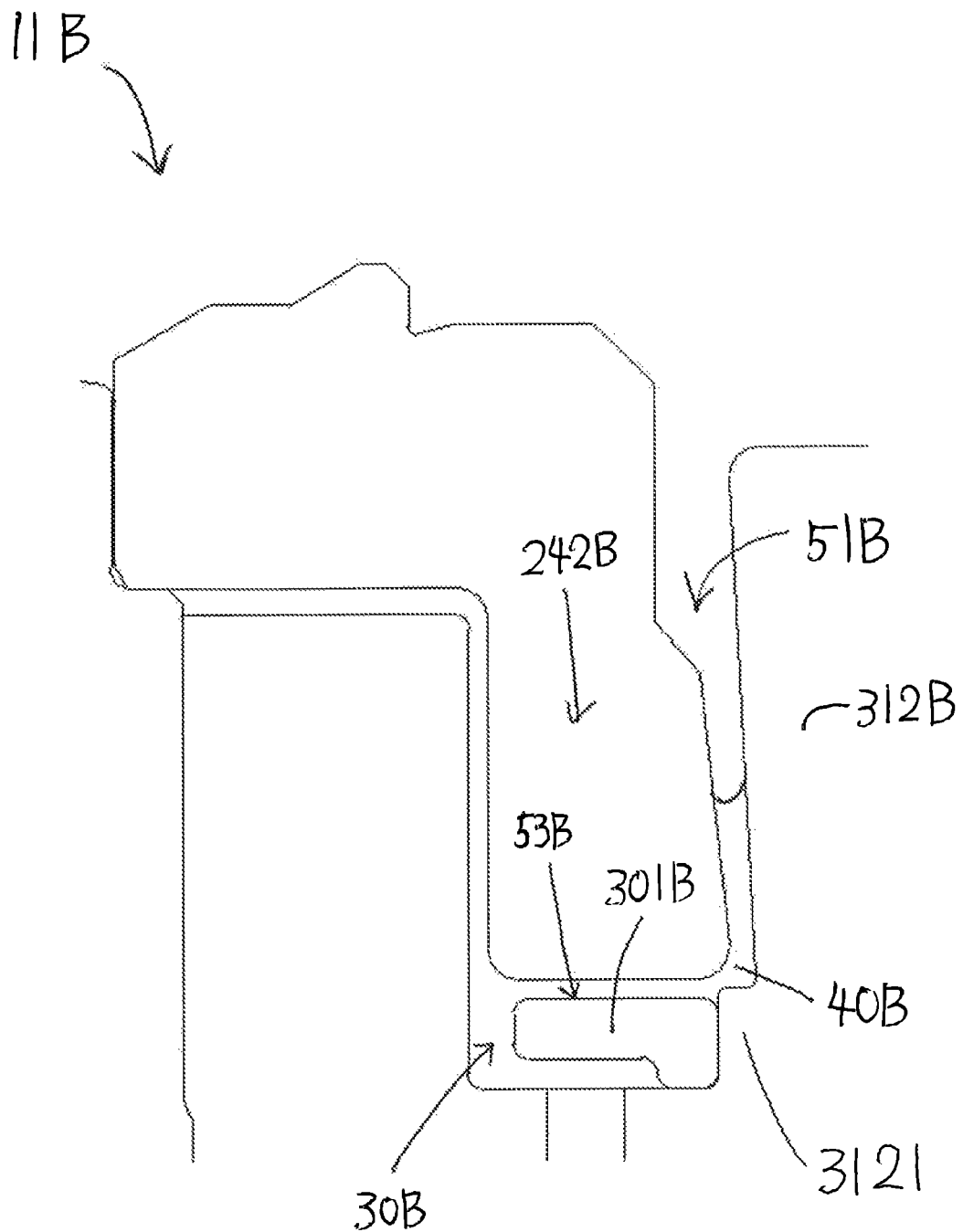
FIG. 5 is a partial schematic cross-sectional view of a spindle motor according to a modification example of a preferred embodiment of the present invention.

FIG. 5 is a partial schematic cross-sectional view of a spindle motor 11B according to a modification example of a preferred embodiment of the present invention. As illustrated in FIG. 5, a step portion 3121 that protrudes to the radial direction inner side from an inner circumferential surface of an outer side cylindrical portion 312B is disposed in a lower end portion of the outer side cylindrical portion 312B. It is preferable that the step portion 3121 extend to the radial direction inner side from the outer circumferential surface of the annular convex portion 242B.

In addition, it is preferable that the distance from a central axis 9B to an inner circumferential surface of the step portion 3121 be equal to or shorter than the minimum distance from the central axis to the inner circumferential surface of the outer side cylindrical portion 312B. In this case, the step portion 3121 is easily processed and the step portion 3121 is formed with high accuracy.

A ring member 30B is preferably fixed to the inner circumferential surface of the step portion 3121. A gap is disposed between an outer circumferential surface of the ring member 30B and the inner circumferential surface of the step portion 3121, and an adhesive is interposed in the gap. The ring member 30B may be press-fitted, for example, into the step portion 3121. When the ring member 30B is fixed to the step portion 3121, the flatness of a ring member flat plate portion 301B with respect to the central axis is significantly improved. In addition, a first gap 53B is configured with high accuracy.

The inner circumferential surface of the outer side cylindrical portion 312B is inclined to the axial direction upper side and the radial direction inner side. In other words, an upper capillary seal portion 51B is inclined to the radial direction inner side toward the upper side. Accordingly, a centrifugal force acting toward a lower end portion side of the upper capillary seal portion 51B is applied to a lubricating oil 40B in the upper capillary seal portion 51B when a spindle motor 11B is driven. Accordingly, leaking of the lubricating oil 40B out of the spindle motor 11B from the upper capillary seal portion 51B is significantly reduced or prevented. In addition, the shape ensures the thickness of an upper portion of the outer side cylindrical portion 312B in the radial direction.

Figure 6:
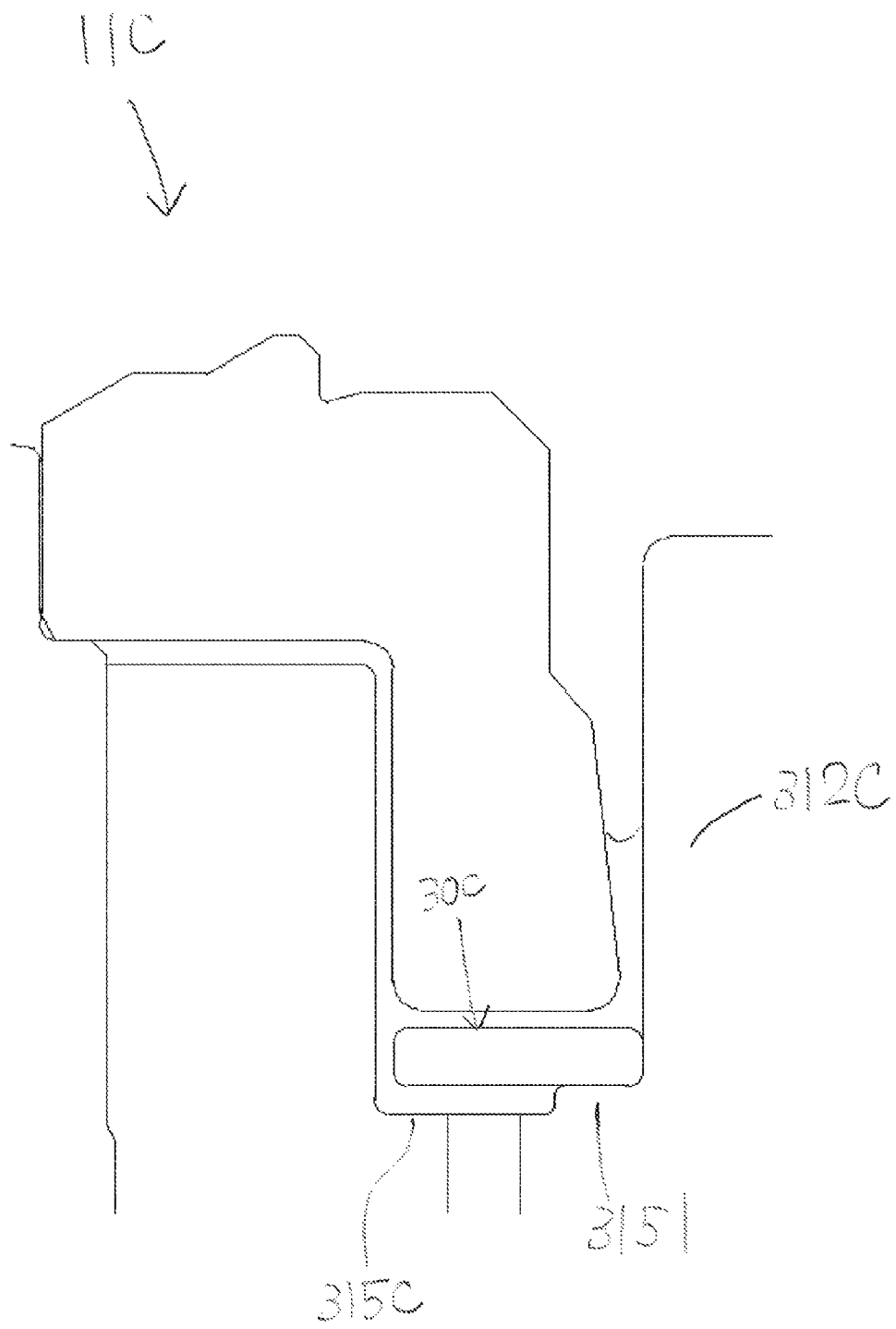
FIG. 6 is a partial schematic cross-sectional view of a spindle motor according to a modification example of a preferred embodiment of the present invention.

FIG. 6 is a partial schematic cross-sectional view of a spindle motor 11C according to a modification example of a preferred embodiment of the present invention. As illustrated in FIG. 6, a bottom surface convex portion 3151 that protrudes to the axial direction upper side is preferably disposed at an outer edge of an annular bottom surface 315C. It is preferable that the bottom surface convex portion 3151 has an annular shape in the circumferential direction. It is preferable that a ring member 30C be in contact with the bottom surface convex portion 3151. In addition, the ring member 30C is fixed to an outer side cylindrical portion 312C. The ring member 30C preferably is formed into a flat plate shape according to a spindle motor 11C in FIG. 6, and thus the ring member 30C is capable of being formed with even higher accuracy.

Figure 7:
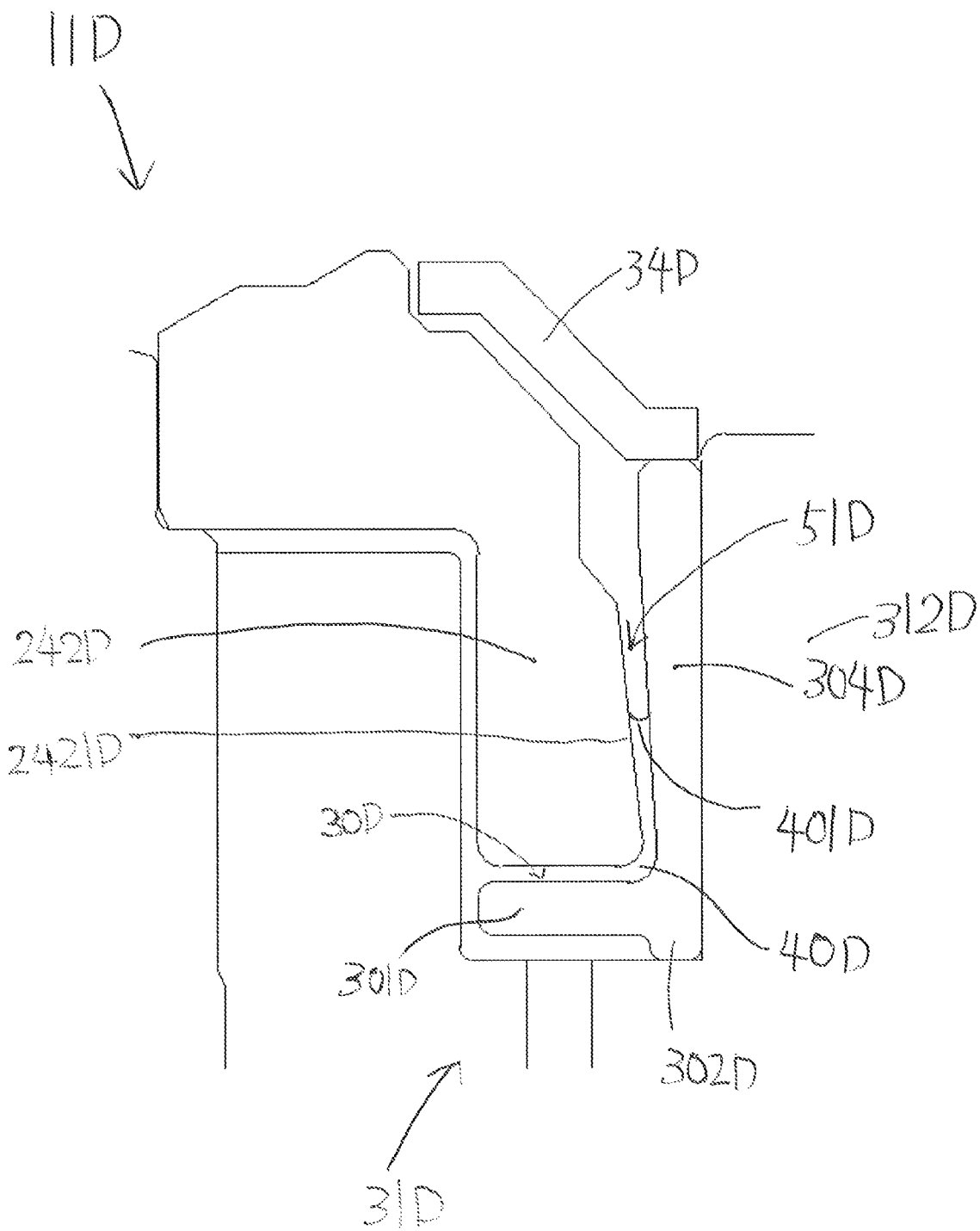
FIG. 7 is a partial schematic cross-sectional view of a spindle motor according to a modification example of a preferred embodiment of the present invention.

FIG. 7 is a partial schematic cross-sectional view of a spindle motor 11D according to a modification example of a preferred embodiment of the present invention. As illustrated in FIG. 7, a ring member 30D preferably includes a ring member flat plate portion 301D, a lower convex portion 302D, and an upper convex portion 304D. The upper convex portion 304D extends to the axial direction upper side from an outer edge of the ring member flat plate portion 301D. It is preferable that the upper convex portion 304D be superimposed on the lower convex portion 302D in the axial direction.

An outer circumferential surface of an annular convex portion 242D and an inner circumferential surface of the upper convex portion 304D define an upper capillary seal portion 51D. More specifically, an annular convex portion outer circumferential surface 2421D faces the inner circumferential surface of the upper convex portion 304D in the radial direction via the upper capillary seal portion 51D. In addition, a gap of the upper capillary seal portion 51D in the radial direction is preferably narrowed downward. In addition, in a stationary state of a spindle motor 11D, an upper liquid surface 401D of a lubricating oil 40D is positioned in the upper capillary seal portion 51D.

The upper convex portion 304D is fixed to an outer side cylindrical portion 312D. A gap is disposed between an outer circumferential surface of the ring member 30D and an inner circumferential surface of the outer side cylindrical portion 312D, and an adhesive is interposed in the gap. The ring member 30D may be press-fitted into the outer side cylindrical portion 312D.

Since the upper convex portion 304D is disposed in the ring member 30D, the fastening strength between the ring member 30D and the outer side cylindrical portion 312D is greatly improved. In other words, the ring member 30D is firmly fixed to a sleeve 31D that has the outer side cylindrical portion 312D. In addition, since the upper convex portion 304D is disposed in the ring member 30D, the upper capillary seal portion 51D is configured with high accuracy.

The inner circumferential surface of the upper convex portion 304D may be inclined toward the axial direction upper side and the radial direction inner side. In addition, a cap 34D may be in contact with an upper end portion of the upper convex portion 304D.

Figure 8:
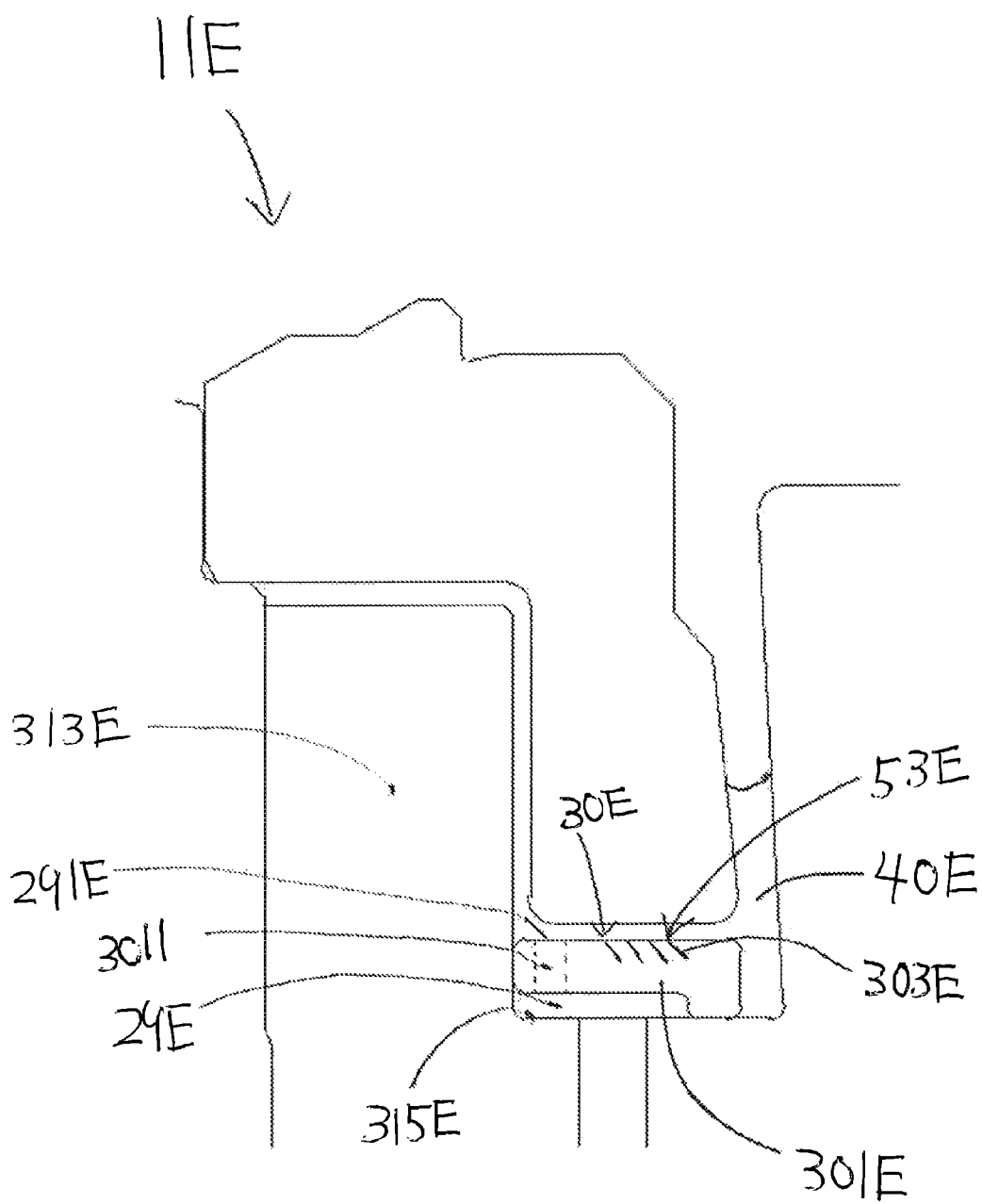
FIG. 8 is a partial schematic cross-sectional view of a spindle motor according to a modification example of a preferred embodiment of the present invention.

FIG. 8 is a partial schematic cross-sectional view of a spindle motor 11E according to a modification example of a preferred embodiment of the present invention. As illustrated in FIG. 8, a ring member 30E is fixed to an inner side cylindrical portion 313E. A gap is preferably disposed between an inner circumferential surface of the ring member 30E and an inner circumferential surface of the inner side cylindrical portion 313E, and an adhesive is interposed in the gap. The ring member 30E may be press-fitted into the inner side cylindrical portion 313E. The ring member 30E preferably includes a ring member flat plate portion 301E. The ring member flat plate portion 301E includes a through-hole 3011 that penetrates the ring member 30E in the axial direction. The through-hole 3011 is filled with a lubricating oil 40E. One or a plurality of the through-holes 3011 are disposed in the ring member flat plate portion 301E.

A second communication hole 29E is preferably disposed between the ring member 30E and an annular bottom surface 315E. In addition, the through-hole 3011 is also a portion of the second communication hole 29E. In other words, an opening 291E of the second communication hole 29E is an upper opening of the through-hole 3011. At least a portion of the opening 291E of the second communication hole 29E is preferably positioned on the farther radial direction inner side than a pumping groove array 303E. The entire opening 291E of the second communication hole 29E may be positioned on the farther radial direction inner side than the pumping groove array 303E. In addition, a portion of the opening 291E of the second communication hole 29E may be superimposed on an area of the pumping groove array 303E. A portion of the opening 291E of the second communication hole 29E and the pumping groove array 303E may be directly superimposed.

Since the ring member 30E is fixed to a sleeve 31E, the flatness of the ring member flat plate portion 301E with respect to the central axis is significantly improved. In addition, a first gap 53E is configured with high accuracy.

Figure 9:
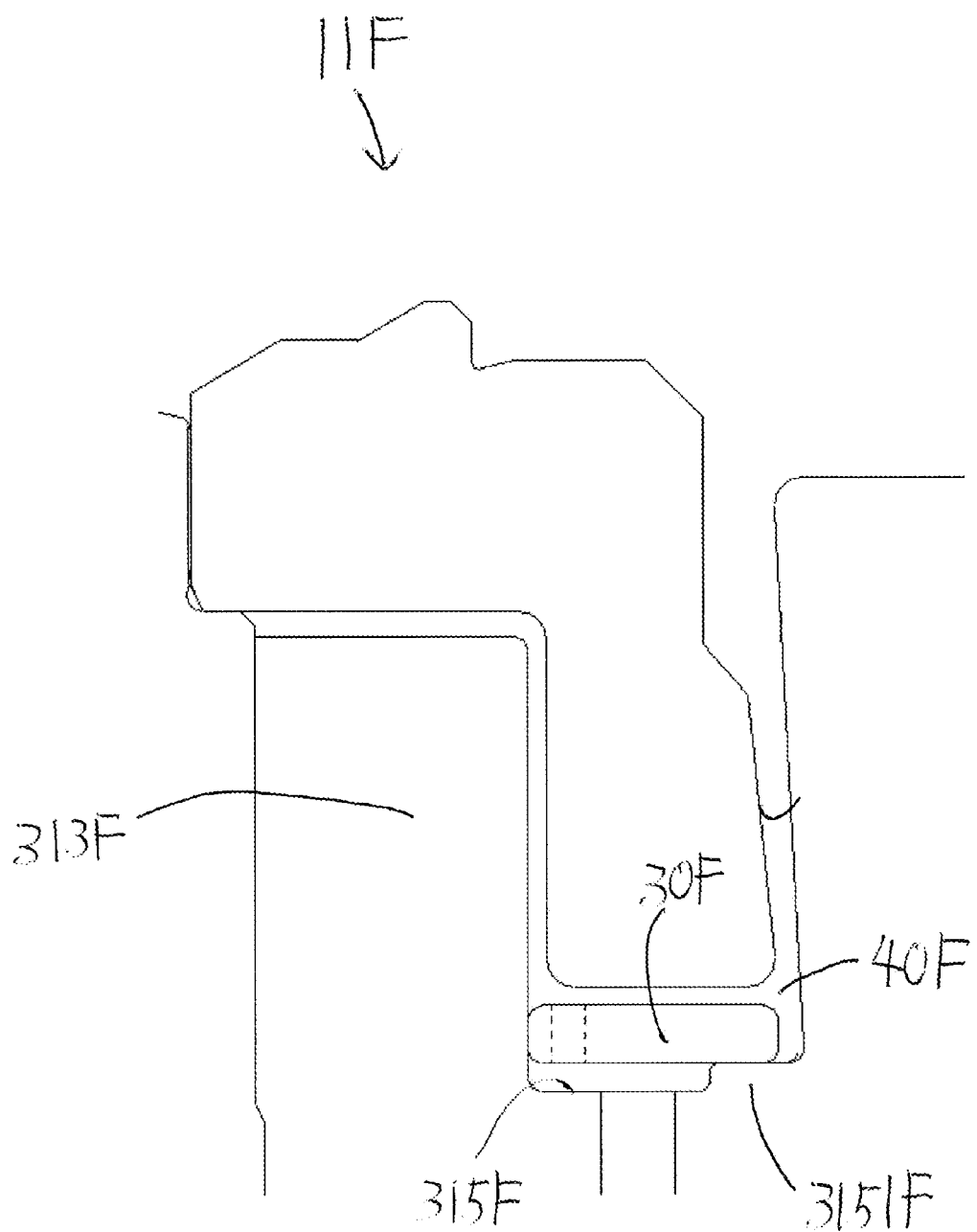
FIG. 9 is a partial schematic cross-sectional view of a spindle motor according to a modification example of a preferred embodiment of the present invention.

FIG. 9 is a partial schematic cross-sectional view of a spindle motor 11F according to a modification example of a preferred embodiment of the present invention. As illustrated in FIG. 9, a bottom surface convex portion 3151F that protrudes to the axial direction upper side is preferably disposed at an outer edge of an annular bottom surface 315F. It is preferable that the bottom surface convex portion 3151F be formed to have an annular shape in the circumferential direction. It is preferable that a ring member 30F be in contact with the bottom surface convex portion 3151F and covered with the lubricating oil 40F. In addition, the ring member 30F is fixed to an inner side cylindrical portion 313F. The ring member 30F preferably is formed into a flat plate shape according to a spindle motor 11F in FIG. 9, and thus the ring member 30F is formed with even higher accuracy.

Figure 10:
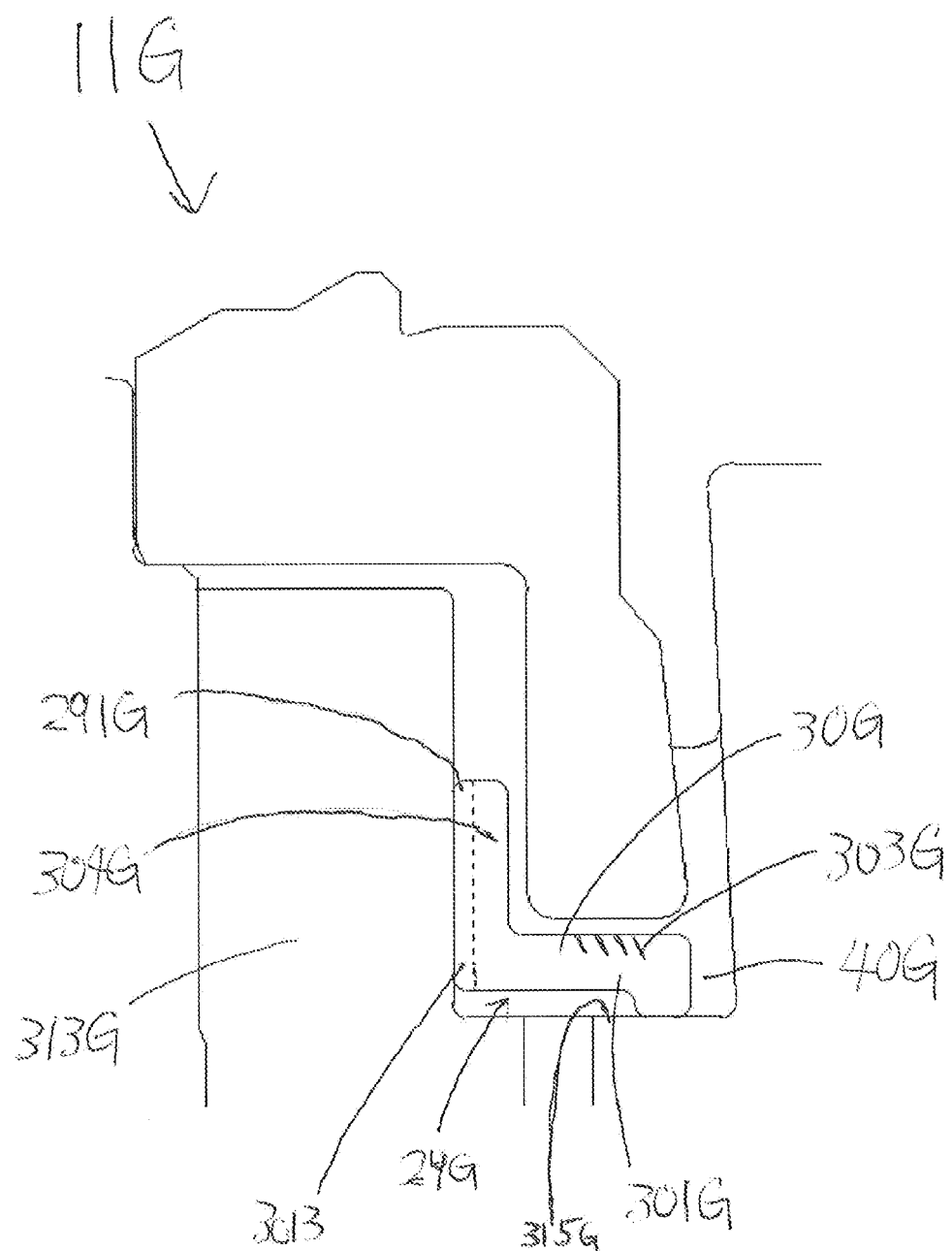
FIG. 10 is a partial schematic cross-sectional view of a spindle motor according to a modification example of a preferred embodiment of the present invention.

FIG. 10 is a partial schematic cross-sectional view of a spindle motor 11G according to a modification example of a preferred embodiment of the present invention. As illustrated in FIG. 10, a ring member 30G preferably includes a ring member flat plate portion 301G and an upper convex portion 304G. The upper convex portion 304G extends to the axial direction upper side from an inner edge of the ring member flat plate portion 301G.

The upper convex portion 304G is fixed to an inner side cylindrical portion 313G. A gap is disposed between an inner circumferential surface of the ring member 30G and an outer circumferential surface of the inner side cylindrical portion 313G, and an adhesive is interposed in the gap. The ring member 30G may be press-fitted, for example, into the inner side cylindrical portion 313G.

Since the upper convex portion 304G is disposed in the ring member 30G, the fastening strength between the ring member 30G and the inner side cylindrical portion 313G is significantly improved. In other words, the ring member 30G is firmly fixed to a sleeve 31G that includes the inner side cylindrical portion 313G.

In addition, an axial direction groove 3013 that penetrates the upper convex portion 304G in the axial direction is disposed in an inner circumferential surface of the upper convex portion 304G. The axial direction groove 3013 is filled with a lubricating oil 40G. One or a plurality of the axial direction grooves 3013 are disposed in the inner circumferential surface of the upper convex portion 304G.

A second communication hole 29G is preferably disposed between the ring member 30G and an annular bottom surface 315G. Further, the second communication hole 29G preferably includes a path that is configured by the axial direction groove 3013 and the inner side cylindrical portion 313G. The path is also a portion of the second communication hole 29G. In other words, an opening 291G of the second communication hole 29G is an upper opening of the path. At least a portion of the opening 291G of the second communication hole 29G is positioned farther on the radial direction inner side than a pumping groove array 303G. The entire opening 291G of the second communication hole 29G may be positioned on the farther radial direction inner side than the pumping groove array 303G.

The ring member according to the preferred embodiments of the present invention and modifications thereof may have various shapes. For example, the ring member may have only the ring member flat plate portion and the one or plurality of grooves may be disposed in a portion of the lower surface of the ring member flat plate portion. The second communication hole is located between the groove of the ring member flat plate portion and the annular bottom surface.

In addition, the one or plurality of grooves may be disposed in the annular bottom surface. The second communication hole is preferably located between the groove of the annular bottom surface and the ring member.

In addition, the pumping groove array may be disposed in the plate portion or the ring member. In the plate portion, the pumping groove array may be disposed on the lower surface of the plate portion, and the pumping groove array may also be disposed at a site other than the lower surface of the plate portion. In addition, in the ring member, the pumping groove array may be disposed on the upper surface of the ring member, and the pumping groove array may be disposed at a site other than the upper surface.

In addition, the spindle motor according to various preferred embodiments of the present invention and modifications thereto are configured to be used in various electronic equipment, such as a fan, without being limited to the disk drive device.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A bearing mechanism comprising:
    a stationary portion including a shaft portion extending along a central axis extending upward and downward, and a plate portion extending to a radial direction outer side from the shaft portion and having an annular or substantially annular shape; and
    a rotating portion that includes a sleeve which is rotatable around the shaft portion, wherein
    the sleeve includes:
        an annular portion that has an annular or a substantially annular shape;
        a cylindrical portion that extends from an outer edge of the annular portion toward an upper side;
            an annular bottom surface that widens from an inner circumferential surface of the cylindrical portion to a radial direction inner side; and
            a first communication hole that includes an opening which is open to the annular bottom surface, and penetrates the annular portion in an axial direction,
    the rotating portion includes:
        a ring member that is arranged to cover at least a portion of the opening of the first communication hole, and faces the plate portion via a first gap;
        an outer circumferential surface of the plate portion faces the inner circumferential surface of the cylindrical portion via an upper capillary seal portion whose gap in a radial direction is narrowed toward a lower side;
    a lubricating oil is interposed in a space between the stationary portion and the rotating portion, which includes:
        the upper capillary seal portion;
        the first gap;
        a second gap between an outer circumferential surface of the shaft and an inner circumferential surface of the sleeve; and
        the first communication hole;
    a pumping groove array, which is configured to cause the lubricating oil move to a radial direction inner side when the rotating portion rotates, is disposed in the plate portion or the ring member;
    a second communication hole, which is a gap widening in the radial direction and connected to the first communication hole, is disposed between the ring member and the annular bottom surface; and
    at least a portion of an opening of the second communication hole is positioned on the farther radial direction inner side than the pumping groove array.

2. The bearing mechanism according to claim 1, wherein the pumping groove array is superimposed in the axial direction on the first communication hole and the second communication hole.

3. The bearing mechanism according to claim 1, wherein the entire opening of the second communication hole is positioned farther towards an inner side than the pumping groove array.

4. The bearing mechanism according to claim 1, wherein
    the ring member is in contact with the annular bottom surface; and
    a gap is disposed between an outer circumferential surface of the ring member and the cylindrical portion.

5. The bearing mechanism according to claim 4, wherein an adhesive is interposed in the gap.

6. The bearing mechanism according to claim 1, wherein
    the ring member includes a ring member flat plate portion that widens in the radial direction, and an annular lower convex portion; and
    the annular lower convex portion is in contact with the annular bottom surface.

7. The bearing mechanism according to claim 6, wherein
    the sleeve includes an inner side cylindrical portion that extends toward the upper side from an inner edge of the annular portion; and
    the opening of the second communication hole is positioned between an inner edge of the ring member and the inner side cylindrical portion.

8. The bearing mechanism according to claim 1, wherein
    the cylindrical portion includes a step portion that protrudes from the cylindrical portion to the radial direction inner side; and
    a distance from the central axis to an inner circumferential surface of the step portion is equal to or shorter than a minimum distance from the central axis to the inner circumferential surface of the cylindrical portion.

9. The bearing mechanism according to claim 8, wherein the ring member is fixed to the inner circumferential surface of the step portion.

10. The bearing mechanism according to claim 9, wherein
    a gap is disposed between an outer circumferential surface of the ring member and the inner circumferential surface of the step portion; and
    an adhesive is interposed in the gap.

11. The bearing mechanism according to claim 1, wherein
    a bottom surface convex portion that protrudes to the upper side is disposed at an outer edge of the annular bottom surface; and
    the ring member is in contact with an upper surface of the bottom surface convex portion.

12. The bearing mechanism according to claim 11, wherein
    a gap is disposed between an outer circumferential surface of the ring member and inner circumferential surface of the cylindrical portion; and
    an adhesive is interposed in the gap.

13. The bearing mechanism according to claim 11, wherein
    the ring member includes a lower convex portion that protrudes to the lower side from the ring member flat plate portion; and
    the upper convex portion is superimposed in the axial direction on the lower convex portion.

14. The bearing mechanism according to claim 1, wherein
    the ring member includes a ring member flat plate portion, and an upper convex portion that extends to an axial direction upper side from an outer edge of the ring member flat plate portion; and the outer circumferential surface of the plate portion and an inner circumferential surface of the upper convex portion define the capillary seal portion.

15. The bearing mechanism according to claim 1, wherein the sleeve includes an inner side cylindrical portion that extends toward the upper side from an inner edge of the annular portion; and the opening of the second communication hole is positioned between an inner edge of the ring member and the inner side cylindrical portion.

16. The bearing mechanism according to claim 1, wherein the sleeve includes an inner side cylindrical portion that extends toward the upper side from an inner edge of the annular portion; and the ring member is fixed to the inner side cylindrical portion.

17. The bearing mechanism according to claim 16, wherein a gap is disposed between an inner circumferential surface of the ring member and an inner circumferential surface of the inner side cylindrical portion; and an adhesive is interposed in the gap.

18. The bearing mechanism according to claim 16, wherein the ring member includes a ring member flat plate portion;

the ring member flat plate portion includes a through-hole that penetrates the ring member flat plate portion; and the through-hole is a portion of the second communication hole and is filled with the lubricating oil.

19. The bearing mechanism according to claim 18, wherein the opening of the second communication hole is an upper opening of the through-hole.

20. The bearing mechanism according to claim 16, wherein a bottom surface convex portion that protrudes to the upper side is disposed at an outer edge of the annular bottom surface; and the ring member is in contact with an upper surface of the bottom surface convex portion.

21. The bearing mechanism according to claim 16, wherein the ring member includes an upper convex portion that extends from an inner edge of the ring member to an axial direction upper side; and the upper convex portion is fixed to the inner side cylindrical portion.

22. The bearing mechanism according to claim 21, wherein a gap is disposed between an inner circumferential surface of the ring member and an outer circumferential surface of the inner side cylindrical portion, and an adhesive is interposed in the gap.

23. The bearing mechanism according to claim 21, wherein an axial direction groove configured to penetrate the upper convex portion in the axial direction is disposed in an inner circumferential surface of the upper convex portion; and the axial direction groove is filled with the lubricating oil.

24. The bearing mechanism according to claim 1, wherein the pumping groove array is a groove array that has a spiral shape or a groove array that has a herringbone shape.

25. A spindle motor comprising:

the bearing mechanism according to claim 1; wherein the stationary portion includes a stator; and the rotating portion includes a rotor magnet which opposes the stator.

26. Electronic equipment comprising the spindle motor according to claim 25.

* * * * *